(12) United States Patent
Shockley et al.

(10) Patent No.: US 6,193,848 B1
(45) Date of Patent: Feb. 27, 2001

(54) PRESSURE-TIGHT VESSEL FOR CYCLIC THERMAL HANDLING

(75) Inventors: Lestle R. Shockley, Naperville, IL (US); Coby W. Stewart, Magnolia, TX (US)

(73) Assignee: Chicago Bridge & Iron Company, Plainfield, IL (US)

( * ) Notice: Subject to any disclaimer, the term of this patent is extended or adjusted under 35 U.S.C. 154(b) by 0 days.

(21) Appl. No.: 09/207,803

(22) Filed: Dec. 9, 1998

(51) Int. Cl.⁷ .................................................. C10B 57/00
(52) U.S. Cl. ........................ 202/108; 202/120; 220/677
(58) Field of Search ....................... 422/39, 208, 226, 422/240, 241, 242; 8/934; 52/223.2; 202/110, 120, 163, 221, 270; 203/11; 220/581, 677, 678, 679, 680; 196/110, 111, 115, 133, 140

(56) References Cited

U.S. PATENT DOCUMENTS

| | | | |
|---|---|---|---|
| 2,179,774 | 11/1939 | Zerbe | 219/137 R |
| 2,244,064 | 6/1941 | Hodge | 219/137 R |
| 2,337,049 | 12/1943 | Jackson | 219/137 R |
| 2,684,170 | 12/1954 | Schmitz | 220/4.17 |
| 3,366,263 | 1/1968 | Murdock | 220/168 |
| 4,147,594 | 4/1979 | Cain et al. | 202/227 |
| 4,241,843 | 12/1980 | Walker et al. | 220/592.25 |
| 4,396,337 * | 8/1983 | Johanning | 414/304 |
| 4,667,731 | 5/1987 | Baumgartner et al. | 165/88 |
| 5,622,604 | 4/1997 | Gerstenkorn et al. | 165/90 |

OTHER PUBLICATIONS

ARCO coke drum in Carson, Carolina, repaired in 1991 by Nooter Corporation

* cited by examiner

Primary Examiner—Marian C. Knode
Assistant Examiner—Frederick Varcoe, Jr.
(74) Attorney, Agent, or Firm—Marshall, O'Toole, Gerstein, Murray & Borun.

(57) ABSTRACT

A pressure-tight vessel subjected to severe thermal cycling through a temperature range including temperatures up to in excess of approximately 700° F. Unlike conventional pressure-tight vessels that are constructed of plates arranged horizontally, the vessel is built of plates that are greater than sixteen feet high. As a result, there are no circumferential seams in a critical area of the cylindrical section of the vessel, providing superior durability.

19 Claims, 2 Drawing Sheets

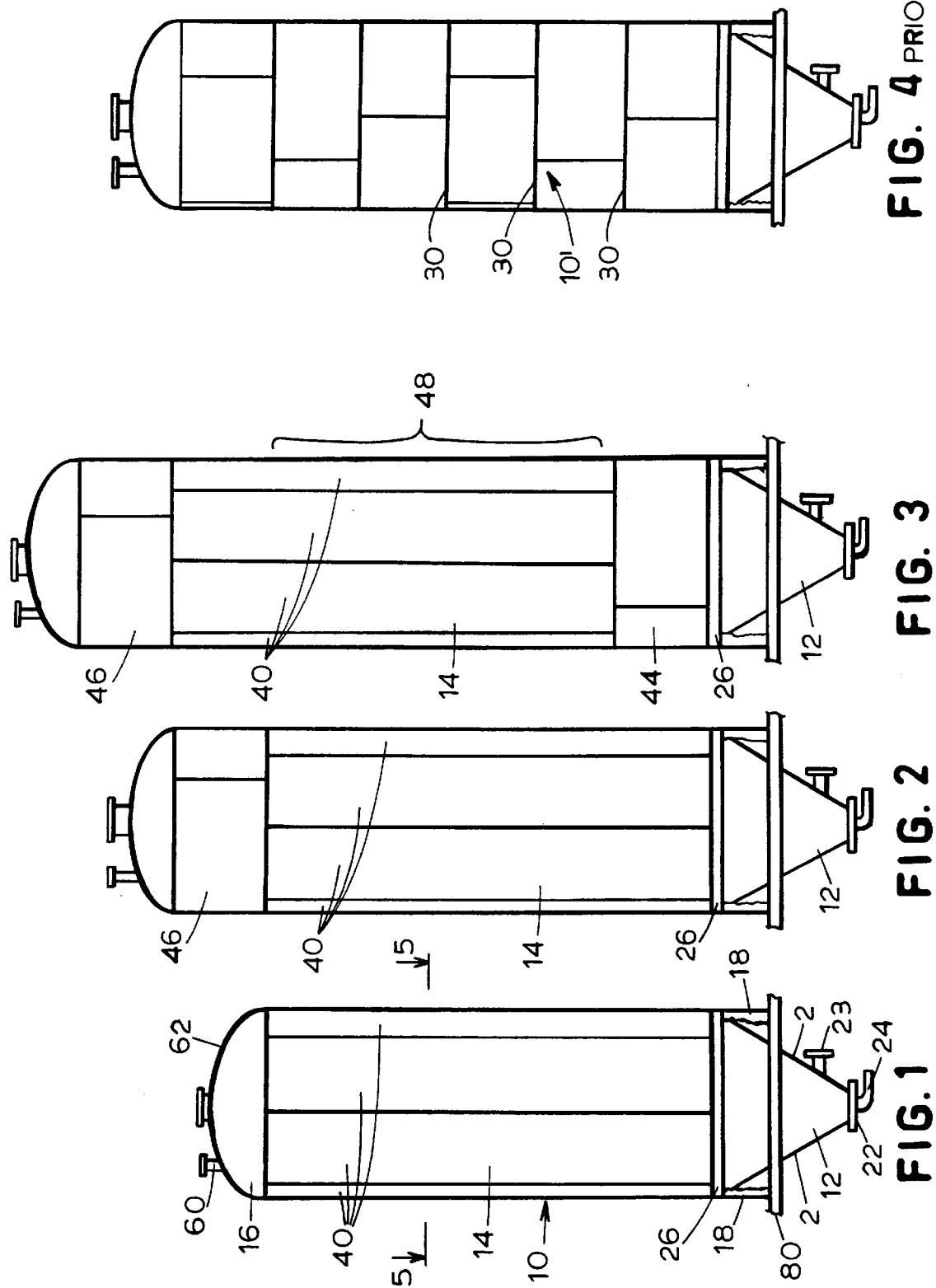

PRESSURE-TIGHT VESSEL FOR CYCLIC THERMAL HANDLING

BACKGROUND OF THE INVENTION

This invention relates generally to pressure-tight vessels for handling large volumes of a product as the product is treated through a thermal cycle with an upper temperature in excess of approximately 700 degrees Fahrenheit. In particular, the invention relates to pressure-tight vessels that could be used for delayed petroleum coking.

Delayed petroleum coking is a process in which a petroleum fraction is heated to a temperature at which it thermally decomposes to provide a solid coke product and a hydrocarbon distillate product. In general, a liquid petroleum feed stock is first distilled until the lighter ends have been recovered and a heavy residuum remains. This heavy residuum is generally preheated to a temperature of at least about 700° F. before being fed to pressure-tight vessel. In the vessel, it may be further heated to temperatures up to 1000° F. under high-pressure conditions that prevent the petroleum fraction from vaporizing until it has partially decomposed.

The decomposition process produces hydrocarbon vapors vessel and a heavy tar that continues to decompose until a porous coke is left in the vessel. The vaporization results in pores and channels in the residuum that may be filled with additional residuum.

Once the vessel is filled, the residuum is allowed to cool, forming coke. The coke may then be purged with steam to remove any remaining volatile components.

To complete the process, water is added to the vessel to quench the coke. As the level of the water progressively rises in the vessel, it quenches the coke to a temperature below 200° F.

In order to increase production speed, the quenching operation is often done as quickly as possible. Unfortunately, the faster the coke is quenched, the greater the wear and tear on the vessel. One of the primary causes of this wear and tear is that the steel plate and the weld material joining the rings of plate that form the vessel have different yield and creep strengths. At the circumferential weld sites, thermal cycling causes progressively increasing permanent strains, eventually leading to distortion and cracking in or near the welds and often bringing to an end the useful life of the vessel.

As described in U.S. Pat. No. 3,936,358, some efforts have been made to reduce the wear and tear on vessels by controlling the quench rate. Unfortunately, this can reduce production speed.

More recently, efforts has been made to adjust the composition of the weld material so that its yield strength more closely matches that of the adjacent steel plates. It is hoped that a closer match will reduce the stresses at the weld sites, extending the life of the vessel. Unfortunately, vessels using the new weld materials have not been in service long enough to know whether this solution will be successful.

There remains a need for a pressure-tight vessel that can better withstand extreme thermal cycling.

SUMMARY OF THE INVENTION

The invention relates to a pressure-tight vessel that has improved resistance to extreme temperature cycling, and thus an improved lifespan when used in operations like delayed petroleum coking.

Like many vessels designed to handle products under severe thermal cycling, the vessel has a vertically-disposed cylindrical section that contains most of the vessel's working volume. The cylindrical section is made of large metal plates, generally on the order of 10' by 40' plates.

Unlike prior vessels used for these purposes, the metal plates are arranged vertically, rather than horizontally. Arranging the plates in this way, so that the vertical edges of each metal plate are greater than sixteen or twenty feet in length, provides a critical section with an extensive height in which there are no horizontal seams. Most conventional plate bending equipment is not capable of bending a plates over more than a twenty-foot width. Accordingly, while it is relatively easy to bend a 10' by 40' plate so that the 10' edges remain straight and the 40' edges are curved, it is more difficult to bend plates as needed for this invention; that is, so that they have a straight edge that is more than sixteen or twenty feet in length.

It has been found that the distortion and cracking in welds that end the useful life of pressure-tight vessels used for delayed petroleum coking commonly occur at a horizontal (or circumferential) seam within or near the lowermost sixteen feet above the base of the vessel. As a result of eliminating horizontal seams at this location, the most likely point of failure can be eliminated, significantly increasing the expected lifespan of the vessel. Alternatively, if the critical section of the vessel is viewed as being at a higher location, the vertically-arranged plates can be positioned there.

BRIEF DESCRIPTION OF THE DRAWINGS

FIG. 1 is an elevational view of an embodiment of a pressure-tight vessel in accordance with the present invention, with the skirt shown only in fragmentary detail;

FIG. 2 is a similar elevational view of an alternative embodiment of a pressure-tight vessel in accordance with the present invention;

FIG. 3 is a similar elevational view of another alternative embodiment of a pressure-tight vessel in accordance with the present invention;

FIG. 4 is a similar elevational view of a conventionally-constructed pressure vessel used for petroleum coking.

DETAILED DESCRIPTION OF THE INVENTION

Figure 5:
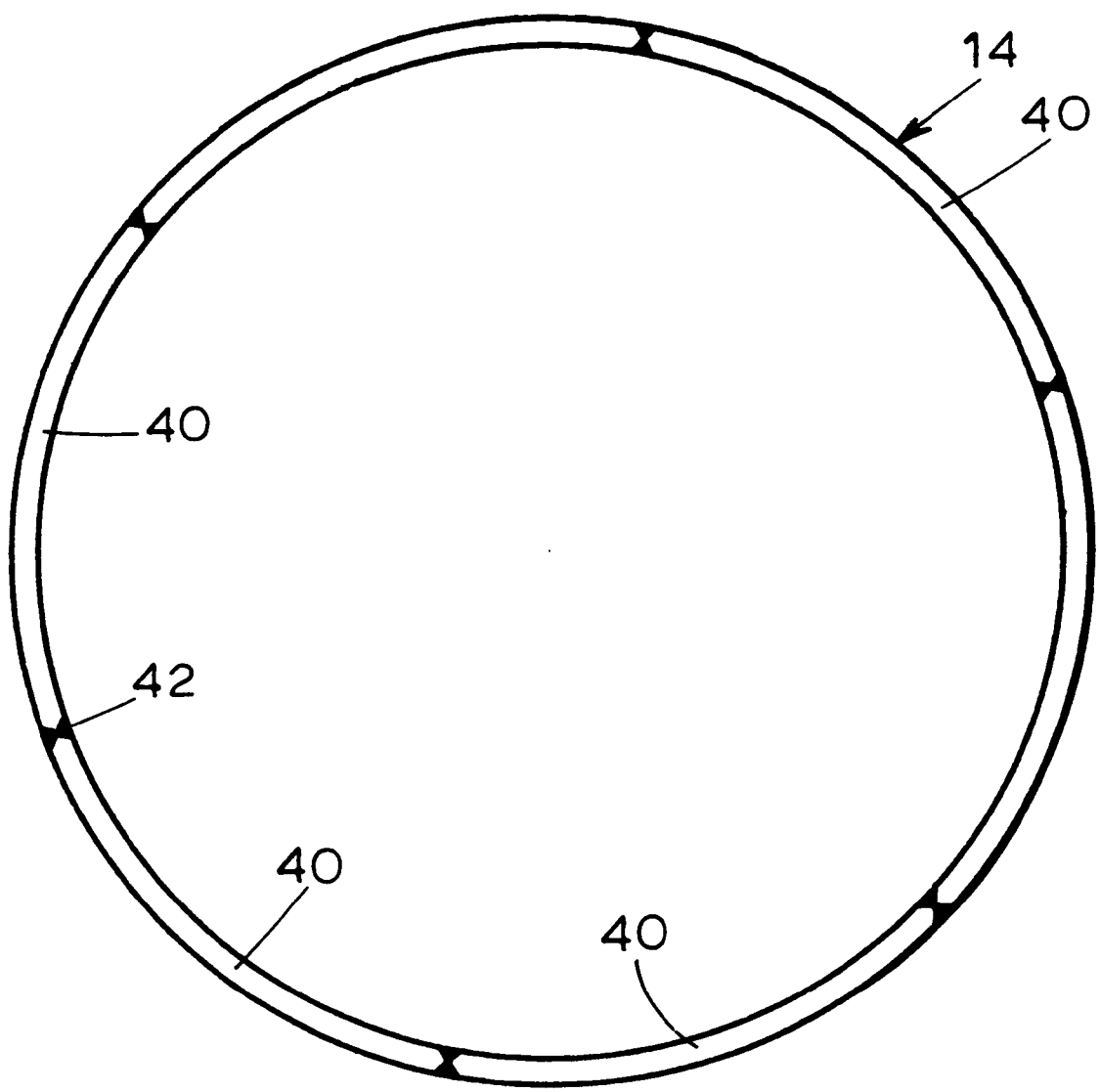
FIG. 5 is an enlarged plan view of the vessel of FIG. 1 taken through lines 5—5 of FIG. 1.

FIG. 1 shows an example of a pressure-tight vessel that offers a longer lifespan under severe thermal cyclic conditions. The illustrated vessel (10) is designed for petroleum coking, and includes a base (12), a cylindrical section (14), a top (16), and a skirt (18). The vessel may be from about 30 to 130' or more feet tall, and has a diameter of from about twelve feet to fifty or more feet. It has an internal volume of at least about 10,000 cubic feet. The vessel can withstand cyclic handling of a product through a temperature range of from approximately 700 to 1000 degrees Fahrenheit to less than approximately 200 degrees Fahrenheit. As illustrated, the vessel can withstand internal pressures up to the range of 50 to 150 psig.

As illustrated, the base (12) has angled sides (2) that allow processed coke to be easily withdrawn from the vessel through a base opening (22). The base is also shown having a steam inlet (23) for adding energy to the product to remove any remaining volatile components before the coke is quenched, and a feed inlet (24) for feeding petroleum distillate and quench water to the vessel. As illustrated, the base includes a transition section in the form of a knuckle (26) leading to the cylindrical section (14) of the vessel. The precise configuration of the base is not essential to the invention and, for other types of pressure-tight vessels in which the cylindrical section is otherwise closed at the bottom, a separate base such as the one illustrated may not be necessary.

The cylindrical section (14) of the vessel (10) is the most important. As seen in FIG. 4, a conventionally-constructed pressure-tight vessel (10') used for petroleum coking is built using steel plates arranged horizontally, resulting in a series of circumferential seams (30) between rows of adjacent plates. Distortion and ultimately cracking at or near the circumferential seams within or near the first sixteen feet of the cylindrical section usually end the useful life of the vessel.

Such circumferential seams have been eliminated from the critical area of the pressure-tight vessel (10) illustrated in FIG. 1, resulting in a vessel with a longer useful life. As illustrated, the cylindrical section (14) is constructed of a series of upstanding plates (40) that are 10 feet wide and greater than 20 feet in length. To accommodate the 50–150 psig internal pressures expected in the vessel, the plates are approximately 1½ inches thick. Plates of other widths and thicknesses could also be used. As best seen in FIG. 5, the plates (40) are joined to each other by vertical welds (42).

As illustrated in FIGS. 1 and 2, the cylindrical section (14) is joined directly to the base (12) by the knuckle (26). Alternatively, as shown in FIG. 3, if the critical section (48) of the vessel is in a higher location, the plates (40) could rest upon a lower ring of plates (44).

Conventionally, five- to sixteen-foot wide metal plates are used for building pressure-tight vessels of the kind contemplated here. Ten-foot wide plates are some of the most commonly used. When such plates are arranged horizontally, there are three circumferential seams within a twenty-foot span of the cylindrical section. As a consequence, using plates with vertical edges greater the twenty feet offers the advantage of eliminating at least two circumferential seams.

In order to provide optimum resistance to internal pressure, the cylindrical section (14) has a rounded, and preferably circular cross-section. In order to form the desired circular cross-section, the upstanding steel plates (40) have been curved across their extensive length (as seen in FIG. 5) instead of their width (as in conventional vessels). While potentially more difficult or expensive, this can be done by press-forming the plates, or, possibly, in other ways. As a result of the use of upstanding plates (40) rather than conventionally-arranged plates, the only welds within the critical section (48) of the cylindrical section are the vertical welds (42) between adjacent upstanding plates. Unlike welds at circumferential seams, these vertical welds have been found to be relatively durable even under the extreme conditions of petroleum coking.

As illustrated in FIGS. 2 and 3, an upper ring (46) of conventionally-arranged steel plates is disposed above the upstanding metal plates (40). It may be preferred, from a durability standpoint, to use metal plates that extend the entire height of the cylindrical section (14), as seen in FIG. 1, thus eliminating all circumferential seams within that section. From an economic standpoint, this may not be practical for particularly tall vessels. Since stress problems are less significant at other parts of the vessel, advantages can be derived so long as there are no circumferential seams in the critical section (48) subject to severe thermal cycling.

In some circumstances, it may be useful to taper the plates (40) to provide reduced thickness above the lower edge of the cylindrical section (14). This may be useful where the upper portions of the cylindrical section do not need to be as strong as the lower portions. Alternatively, with plates having a constant thickness, the thickness of the vertical weld (42) between adjacent plates may be reduced in the upper portions of the vessel, where less strength is needed. As yet another alternative, transition sections such as knuckles can be formed between one or both ends of the upstanding plates and either other plates or portions of the base or top, as desired.

As illustrated, the cylindrical section (14) of the vessel (10) is covered by a top (16). The top is conventionally domed, and provides a volume for steam produced during extreme thermal cycling. Other configurations may also be useful. As illustrated, the top has a recovery outlet (60) for withdrawing hydrocarbon vapors from the vessel during petroleum coking, and a separate port (62) that can provide access for an auger to be used when withdrawing coke from the vessel. The recovery outlet and port may not be necessary if the vessel is to be used for other purposes.

The skirt (18) wraps around the vessel, extending between the knuckle (26) at the top of the base (12) and the floor (80), and is used to support the vessel (10) in its upright position.

The foregoing detailed description has been given for clarity of understanding only. No unnecessary limitations should be understood therefrom, as modifications would be obvious to those skilled in the art.

We claim:

1. A pressure-tight vessel with a capacity of at least 10,000 cubic feet comprising:

a base; and a vertically-disposed cylindrical section adjoining the base, the section comprising a set of metal plates having vertical edges, the vertical edges of each metal plate adjoining the base being greater than sixteen feet in length, resulting in the section having no horizontal seams within the first sixteen feet above the base;

said vessel being pressure-tight and adapted for cyclic handling of a product through a temperature range with an upper temperature in excess of approximately 700 degrees Fahrenheit.

2. A pressure-tight vessel as recited in claim 1, in which the base comprises means for cooling the product.

3. A pressure-tight vessel as recited in claim 1, in which the pressure-tight vessel further comprises a steam inlet for adding energy to the product in the vessel.

4. A pressure-tight vessel as recited in claim 1, the vessel further comprising a domed top.

5. A pressure-tight vessel as recited in claim 1, in which the cylindrical section has a circular cross-section.

6. A pressure-tight vessel as recited in claim 1, in which the metal plates are 5–20 foot wide metal plates that have been press-formed along their length to an 8- to 50-foot radius.

7. A pressure-tight vessel as recited in claim 1 where a transition section is formed at one end of the vertically-disposed cylindrical plates.

8. A pressure-tight vessel as recited in claim 1, in which the plates are tapered, with a greater thickness at the base and a lesser thickness above the base.

9. A pressure-tight vessel as recited in claim 1, in which the vertical edges of each metal plate adjoining the lower edge of the cylindrical section are twenty feet or more in length, resulting in the cylindrical-section having no horizontal seams within the first twenty feet above the base.

10. A pressure-tight vessel as recited in claim 1, in which vertical weld seams between the plates have a relatively great thickness at the base and a lesser thickness above the base.

11. A pressure-tight vessel as recited claim 1, in and further comprising:

means for feeding petroleum distillate to the pressure-tight vessel; and means for withdrawing hydrocarbon vapors from the pressure-tight vessel.

12. A pressure-tight vessel with a capacity of at least 10,000 cubic feet comprising:

a base; and a vertically-disposed cylindrical section adjoining the base, the section comprising a set of metal plates having vertical edges, the vertical edges of each metal plate adjoining the base being greater than twenty feet in length, resulting in the section having no horizontal seams within the first twenty feet above the base;

said vessel being pressure-tight and adapted for cyclic handling of a product through a temperature range with an upper temperature in excess of approximately 700 degrees Fahrenheit.

13. A pressure-tight vessel as recited in claim 12, in which the vessel further comprises a base beneath the cylindrical section with means for cooling the product.

14. A pressure-tight vessel as recited in claim 12, and further comprising means for adding steam to the vessel.

15. A pressure-tight vessel as recited in claim 12, and further comprising means for withdrawing hydrocarbon vapors from the vessel.

16. A pressure-tight vessel as recited in claim 12, and further comprising a domed top.

17. A pressure-tight vessel as recited in claim 12, in which the cylindrical section has a circular cross-section.

18. A pressure-tight vessel as recited in claim 12, in which the metal plates are 5–20 foot wide metal plates that have been press-formed along their length to an 8- to 50-foot radius.

19. A pressure-tight vessel as recited in claim 12, in which a transition section is formed at one end of the vertically-disposed cylindrical plates.

* * * * *

UNITED STATES PATENT AND TRADEMARK OFFICE
CERTIFICATE OF CORRECTION

PATENT NO. : 6,193,848 B1
DATED : February 27, 2001
INVENTOR(S) : Shockley, et al.

It is certified that error appears in the above-identified patent and that said Letters Patent is hereby corrected as shown below:

Column 5, claim 11,
Line 5, between "recited" and "claim 1", insert the word -- in --
Line 5, between "claim 1" and "and", delete the word -- in --

Signed and Sealed this

Thirteenth Day of November, 2001

Attest:

NICHOLAS P. GODICI
Attesting Officer    Acting Director of the United States Patent and Trademark Office